United States Patent
Weikal

(10) Patent No.: US 8,879,183 B1
(45) Date of Patent: Nov. 4, 2014

(54) SEGMENTING OF READ-MODIFY-WRITE OPERATIONS

(71) Applicant: Seagate Technology LLC, Cupertino, CA (US)

(72) Inventor: Adam Weikal, Butler, PA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/832,178

(22) Filed: Mar. 15, 2013

Related U.S. Application Data

(60) Provisional application No. 61/712,707, filed on Oct. 11, 2012.

(51) Int. Cl.
*G11B 5/09* (2006.01)

(52) U.S. Cl.
CPC .................................... *G11B 5/09* (2013.01)
USPC ........................................................ 360/48

(58) Field of Classification Search
None
See application file for complete search history.

(56) References Cited

U.S. PATENT DOCUMENTS

| | | |
|---|---|---|
| 7,231,497 B2 | 6/2007 | Trika |
| 7,440,221 B2 | 10/2008 | Tsuchinaga |
| 7,965,465 B2 | 6/2011 | Sanvido |
| 7,966,456 B2 | 6/2011 | Trika |
| 7,970,989 B2 | 6/2011 | Matthews |
| 7,982,994 B1 | 7/2011 | Erden |
| 8,179,627 B2 | 5/2012 | Chang |
| 8,270,256 B1 | 9/2012 | Juang |
| 8,300,341 B2 | 10/2012 | Itakura |
| 8,310,786 B2 | 11/2012 | de la Fuente et al. |
| 2005/0144396 A1 | 6/2005 | Eschmann |
| 2011/0085266 A1 | 4/2011 | Kanai |
| 2011/0138106 A1 | 6/2011 | Prabhakaran |
| 2011/0292545 A1 | 12/2011 | Katada |
| 2011/0299373 A1 | 12/2011 | Ho |
| 2012/0060073 A1 | 3/2012 | Itakura |
| 2012/0069466 A1 | 3/2012 | Okamoto |
| 2012/0099216 A1 | 4/2012 | Grobis |
| 2012/0102261 A1* | 4/2012 | Burger et al. ................. 711/103 |
| 2012/0162808 A1 | 6/2012 | Masuda |
| 2012/0194937 A1 | 8/2012 | Tagami |
| 2012/0212847 A1 | 8/2012 | Sato |
| 2012/0233432 A1 | 9/2012 | Feldman |

(Continued)

OTHER PUBLICATIONS

Design Issues for a Shingled Write Disk System, Ahmed Amer, et al.; © 2010 IEEE.

(Continued)

*Primary Examiner* — Regina N Holder
(74) *Attorney, Agent, or Firm* — Cesari & Reed LLP; Kirk A. Cesari; David K. Lucente

(57) ABSTRACT

Systems, devices, apparatuses, and methods for segmented read-modify-write operations are disclosed. The examples provided can allow a system to perform a read-modify-write (RMW) operation for data stored in a main storage that has a larger data size than is capable of being stored in an available buffer. Examples of such a system include discs having bands of shingled tracks. In such example, each band can be split into segments containing one or more tracks and a read-modify-write-write (RMWW) operation can be performed for each segment. Further, a logical guard band can be implemented to protect the segments from overwriting a next track in a shingled band. Also, multiple scratchpads may be implemented.

20 Claims, 6 Drawing Sheets

(56) References Cited

U.S. PATENT DOCUMENTS

| | | |
|---|---|---|
| 2012/0250174 A1 | 10/2012 | Sueishi |
| 2012/0300328 A1 | 11/2012 | Coker |
| 2012/0300333 A1 | 11/2012 | Tinker |
| 2012/0303867 A1 | 11/2012 | Hall |
| 2012/0303884 A1 | 11/2012 | Hall |
| 2012/0303889 A1 | 11/2012 | Coker |
| 2012/0303928 A1 | 11/2012 | Hall |
| 2012/0307400 A1 | 12/2012 | Kawabe |
| 2013/0027802 A1 | 1/2013 | Kim |
| 2013/0027806 A1 | 1/2013 | Cho |
| 2013/0031296 A1 | 1/2013 | Na |
| 2013/0031306 A1 | 1/2013 | Kim |
| 2013/0031317 A1 | 1/2013 | Ryu |
| 2013/0031406 A1 | 1/2013 | Cho |
| 2013/0038960 A1 | 2/2013 | Song |
| 2013/0038961 A1 | 2/2013 | Song |
| 2013/0321948 A1* | 12/2013 | Bandic et al. ........... 360/75 |

OTHER PUBLICATIONS

Emulating a Shingled Write Disk, Rekha Pitchumani, et al., International Symposium on Modeling, Analysis, and Simulation of Computer and Telecommunication Systems, at Washington, DC (Aug. 2012).

* cited by examiner

SEGMENTING OF READ-MODIFY-WRITE OPERATIONS

BACKGROUND

The present disclosure relates to data storage devices, and more specifically to data storage memories that use read-modify-write (RMW) operations, such as shingled magnetic recording (SMR).

SUMMARY

In one embodiment, an apparatus may include a data storage medium including a band of tracks having multiple data tracks arranged in a shingled manner where at least one track partially overlaps an adjacent track and a controller. The controller can be configured to virtually divide the band of tracks into at least a first segment and a second segment, each segment containing at least one track, perform a first read-modify-write-write operation for the first segment, and perform a second read-modify-write-write operation for the second segment.

In another embodiment, a method may include dividing a shingled band of tracks of a data storage medium into at least a first segment and a second segment, each segment containing at least one track, performing a first read-modify-write-write operation for the first segment, and performing a second read-modify-write-write operation for the second segment.

In yet another embodiment, an apparatus can include a computer readable data storage medium storing instructions that when executed by a processor, cause the processor to perform a method. The method may include dividing a shingled band of tracks of a data storage medium into at least a first segment and a second segment, each segment containing at least one track, performing a first read-modify-write-write operation for the first segment; and performing a second read-modify-write-write operation for the second segment.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
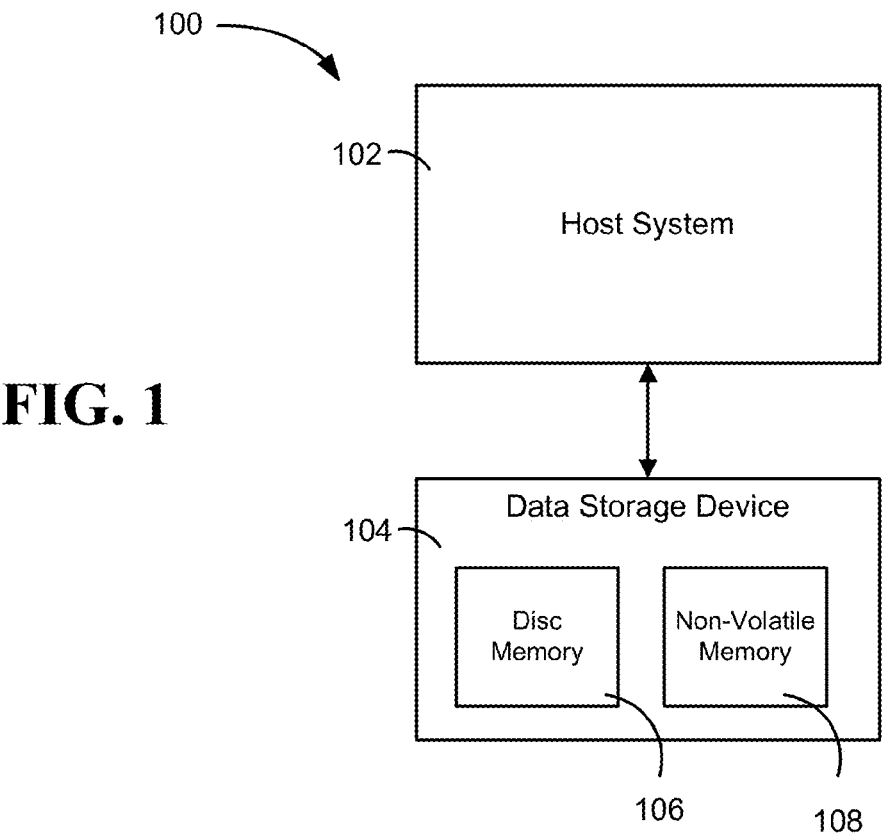
FIG. 1 is a diagram of an illustrative embodiment of a system designed for segmented read-modify-write operations.

FIG. 1 depicts an embodiment of a system for segmented read-modify-write operations, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data, such as a hard disc drive (HDD) or a hybrid disc drive. The host 102 and DSD 104 may be connected by way of an interface such as a wired or wireless connection, or by a local area network (LAN) or wide area network (WAN). In some embodiments, the DSD 104 can be a stand-alone device not directly connected to the host 102, or the host 102 and DSD 104 may both be part of a single unit.

The DSD 104 can include one or more nonvolatile memories. In the depicted embodiment, the DSD 104 can include a rotatable disc memory 106. In other embodiments, the DSD 104 may contain additional memories or memory types, including volatile and nonvolatile solid state memories. For example, DSD 104 could be a hybrid HDD with both a disc memory 106 and non-volatile solid state memory 108.

In an embodiment of system 100, the disc memory 106 can have one or more zones configured to store data on shingled data tracks using shingled magnetic recording (SMR). SMR is a recording system to increase data recording density on a disc, whereby at least one track of data partially overlaps an adjacent data track. SMR will be discussed in more detail with regard to FIGS. 2-4.

Figure 2:
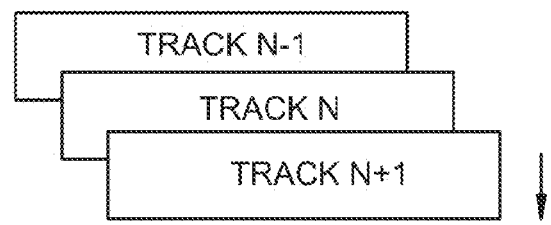
FIG. 2 is a diagram of an illustrative embodiment of shingled recording for use with segmented read-modify-write operations.

SMR is a scheme of executing a write operation in one radial direction across a disc, where tracks partially overlap each other similar to roofing shingles. Referring to FIG. 2, if it is assumed that writing is performed in an arrow-indicated direction in the shingle-write scheme, when writing is performed on track N, adjacent track N−1 is partially overlapped. Also, when writing is performed on track N+1, adjacent track N is partially overlapped. In contrast to recording methods whereby each track is written without any intended overlap, SMR can result in an increase of the tracks per inch (TPI) characteristic as a recording density in a radial direction of a storage medium.

Figure 3:
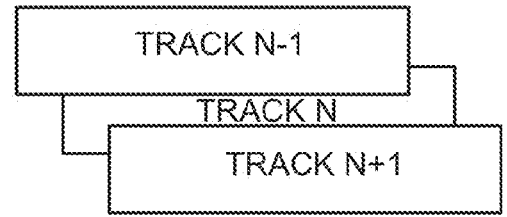
FIG. 3 is a diagram of another illustrative embodiment of shingled recording for use with segmented read-modify-write operations.

Further, SMR can generate flux in one direction. Therefore, a constraint that N−1 track cannot be written after the N track is written should be met. As illustrated in FIG. 3, after writing on track N, if track N−1 is written in a reverse direction of the shingled recording direction, track N may become unreadable due to overlapping or Adjacent Track Interference (ATI). Therefore, changing the data recorded to track N−1 after track N is recorded, or the data recorded to track N after track N+1 is recorded, requires a different writing strategy than with non-shingled tracks, which can simply be overwritten at any time.

Figure 4:
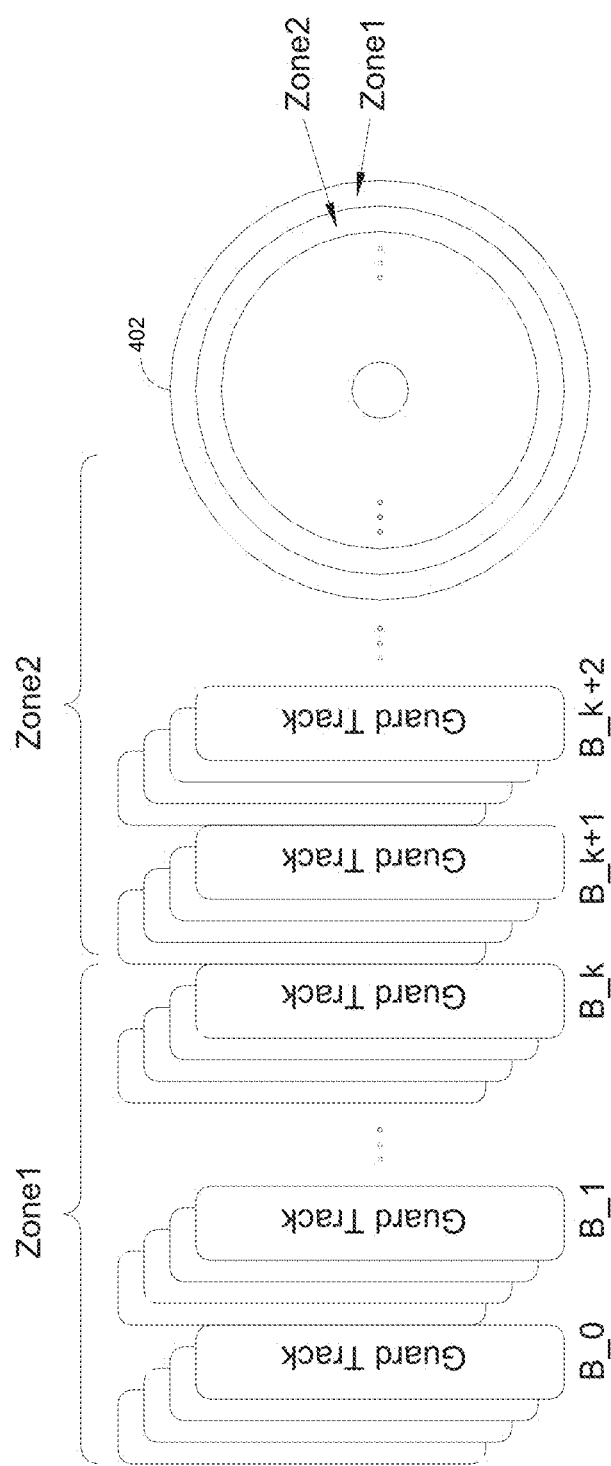
FIG. 4 is a diagram of another illustrative embodiment of a system with shingled recording for use with segmented read-modify-write operations.

Turning now to FIG. 4, a diagram of another illustrative embodiment of a system with shingled recording for segmented read-modify-write operations is shown. Rotating disc media 402 may be divided into a plurality of zones (e.g. Zone 1, Zone 2, etc.), and each zone may contain a plurality of data tracks.

Due to the single-write direction of SMR, writing a given track N−1 after track N has been written may require rewriting all shingled tracks that follow track N−1 (i.e. track N, track N+1, track N+2, etc.). In order to accomplish this realistically, a set of tracks may be grouped into a "band," with the band ending with a guard track. In some embodiments, the guard track can be a non-shingled track, or a shingled track which is not used to record data. When track N−1 needs to be written, tracks N−1 through the Guard Track can be rewritten, while tracks in other bands may not be affected. Accordingly, the tracks in each zone may be divided into a plurality of bands. As depicted in the example embodiment of FIG. 4, Zone 1 can contain Band 0 (B_0) through Band k (B_k), while Zone 2 can contain Band k+1 (B_k+1), Band k+2 (B_k+2), etc. In an example embodiment, each zone may contain 100 data tracks, and the 100 data tracks can be divided into 10 bands containing 10 tracks each. Each track can be further divided into data sectors associated with a plurality of logical block addresses (LBAs), with data capable of being stored to each LBA.

On an embodiment, a DSD employing SMR may receive a write command to overwrite one or more LBAs corresponding to data sectors of shingled tracks in a band. The data to be written may come from a host device, a media cache of the DSD, or another location. In order to perform the write command, it may be necessary to read multiple tracks of the band, modify the read data based on the write command, and then write the modified data back to a band. This can be called a Read-Modify-Write operation (RMW), or more specifically for SMR devices, a Banded Read-write Operation (BRO). Data read from the tracks may be temporarily stored in a volatile memory, such as a buffer or register, where it is modified before being written back to a band.

If a write command includes LBAs associated with data sectors of tracks in Band 1, for example, data could be read from Band 1 to volatile memory, and modified according to the write command. If the DSD starts writing the modified data back to Band 1 and an unexpected power failure occurs, some data may be irretrievably lost. For example, if track N had been partially written when the power failure occurred, track N+1 may be unreadable due to adjacent track interference. Since the contents of track N+1 in the volatile memory might be lost as well, there may be no way to recover the data for track N+1.

Figure 5:
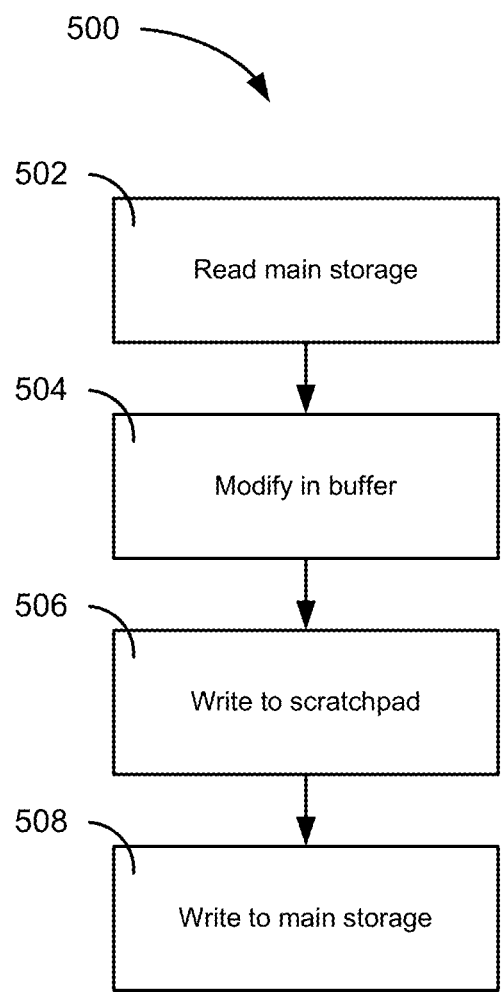
FIG. 5 is a flowchart of an illustrative embodiment of a method of segmented read-modify-write operations.

One solution to avoid such a problem can be performing a read-modify-write-write (RMWW) instead of a RMW operation. Referring to FIG. 5, a flowchart of an illustrative embodiment of a read-modify-write-write operation is shown and generally designated 500. The method can involve reading the data from Band 1, located on a main storage device, at 502, and storing it to a buffer. The main storage device can be a shingled disc type memory, a non-volatile solid state memory requiring an RMW operation, or any other type of memory that might use an RMW operation. The buffer can be a volatile solid state memory such as DRAM or a non-volatile solid state memory such as Flash memory. Once the data is in the buffer, it may be modified or merged with new or other data, at 504. Data operations including, but not limited to, writing new data, modifying existing data, band cleaning, or any combination thereof may be performed.

Once any modifications are complete, the modified data can be written from the buffer to an available nonvolatile memory area, at 506. In an embodiment, this may be a scratchpad area on a disc, a different nonvolatile memory such as Flash memory, or any combination thereof. Further, as described below, multiple scratchpads may be used, can be different sizes, and may or may not be on the same storage medium.

The modified data can also be written back to the main storage device, at 508, to the same band the original data was read from or could be written to a different band. Performing the RMWW operation adds a layer of redundancy to help protect against data loss. For example, if a power loss occurs during the write to the scratch pad, the original data should still be safe in Band 1. If a power loss occurs during the write to Band 1, the modified data should be secure in the scratch pad.

The RMWW method may rely on the buffer to store the data as it is transferred from the main storage medium to the scratchpad. Issues may arise when the buffer is not sufficiently large to hold all of the data in a band that is to be transferred. These issues can occur because a change to any piece of data on a band may require a read or write to the entire band. For example, when a two kilobyte piece of data on a 100 megabyte band is changed, the entire 100 megabyte may have to be read into or written from the buffer. The band size may have to be reduced or the buffer size increased in order to avoid buffer capacity issues.

A solution to the problem of buffer sizing can be to divide the band into read segments of selected tracks for purposes of performing a RMWW operation. Each segment can contain a plurality of tracks, fractions of a track, can be fixed or dynamic in size, and may be designated in ascending LBA order across the band. When data operations need to be performed, just the segment, rather than the entire band, may have to be modified, saving time and reducing the buffer size.

The drawback to dividing up a band into segments is that there is no physical guard track within a band. Without a guard track, corruption of track N can occur when track N−1 is modified. To overcome this problem, a logical guard track may be implemented in place of a physical guard track at the end of a segment, allowing for control and flexibility when writing layers of shingled data. A logical guard track may be at least one track in width and may be moved within the user accessible area of a band. The logical guard track may be floating, that is it can move as the segmenting progresses; further, more than one logical guard track may be used in a band.

The method of segmenting of read-modify-write operations can work when data within a segment (segment one), containing N tracks and starting at track A, can be read from the main storage into the buffer, which tracks A through N. In various embodiments, track A may be a first physically located track in a band or may be another track in the band because a RMW operation can be performed for only such portions from the end of a band than need to be rewritten. For example, if all merges are within the last 3 tracks of a band, only those three tracks might need to be rewritten because writing of those should not interfere with the previously occurring tracks (that is if the direction of overlap occurs where the last track overlaps the next to last track). However, if data is to be changed in the first track of a band, all the tracks of that band should need to be rewritten in a RMW operation.

After the selected data is in the buffer, data operations may be performed to modify the data, such as merging any new data with the existing data. Once the data operations are complete, the modified data, including tracks A though N, may be written to a first scratchpad (spA). Then, modified tracks A through N−1, which are now in spA, can be written to the respective band at the main storage. Since a write to track N−1 may corrupt track N, track N can be considered a logical guard track on the main storage because the data from track N is in the buffer and also may be currently stored in spA. In some situations, when a read operation is executed during this process, such reads may be directed to a respective scratchpad because the data in the scratchpads may be the most recently modified or only valid copy, such as when the data on the logical guard track, track N, on the main storage medium could be corrupted.

Further, a second segment may be selected for the next occurring tracks that have not yet been modified as part of the current RMWW operation, which in the given example may contain tracks N+1 to M. The data from the second segment can be read from the main storage into the buffer, which can also still contain track N, and modified. The second segment can then be written to spB and can result in spB containing tracks N through M because track N can also be available in the buffer. After the second segment is stored into spB, modified tracks N through M−1 can then be written to the main storage. At this point, tracks A through M−1 on the main storage may contain valid data and M could be a logical guard track. This process may repeat multiple times until all segments in a band have undergone a RMWW operation, thus providing a complete RMWW operation for an entire band, which can be useful when the data capacity of the band is larger than the size of an associated buffer used to perform RMWW operations.

Figure 6:
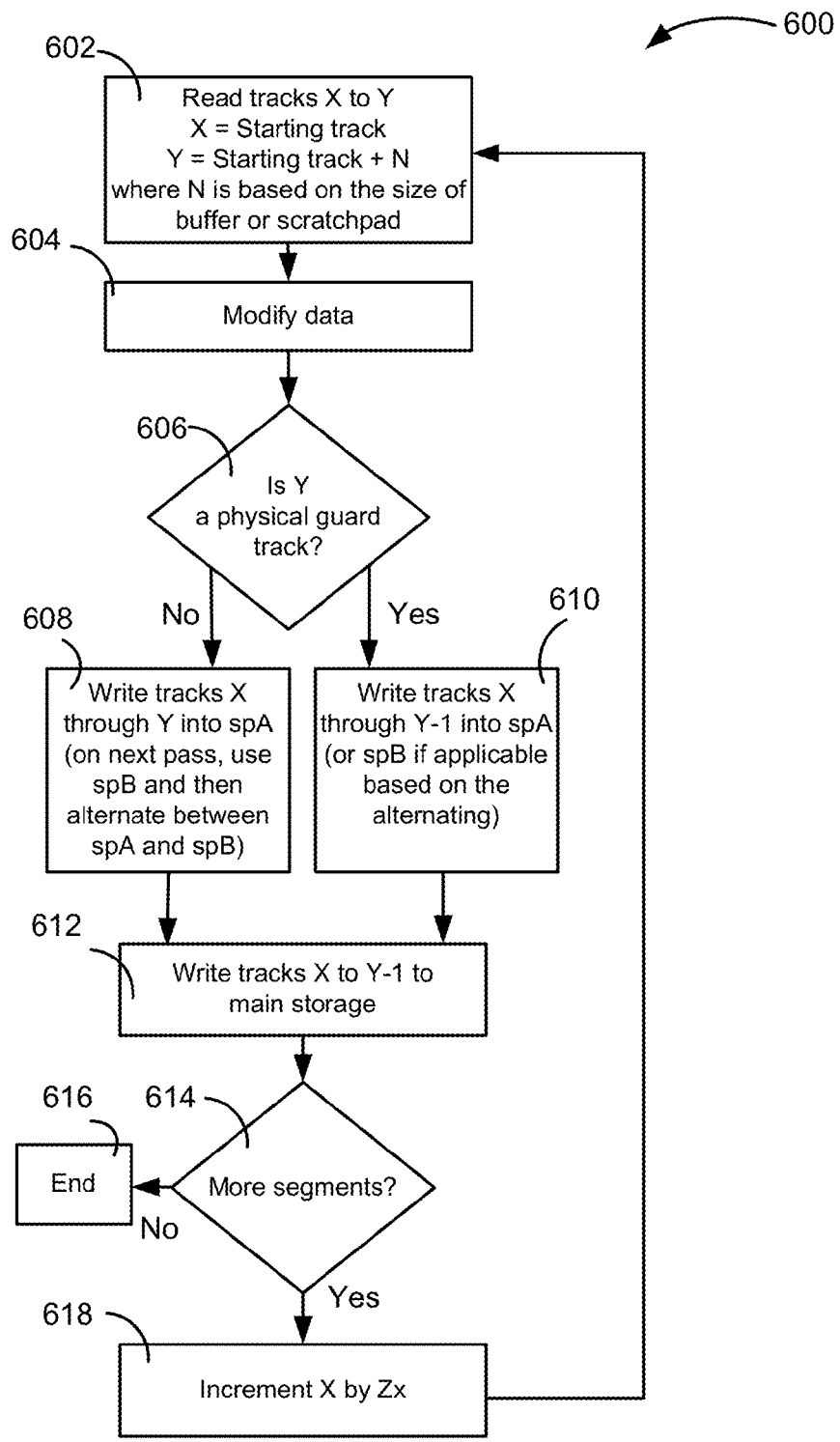
FIG. 6 is another flowchart of an illustrative embodiment of a method of segmented read-modify-write operations.

Referring to FIG. 6, a flowchart of an illustrative embodiment of a method of segmenting of read-modify-write operations is shown and generally designated 600. In some examples, the method 600 can allow a system to perform a RMW operation for data stored in a main storage that has a larger data size than is capable of being stored in an associated buffer. An example of such a system is shown in the figures above with respect to a disc having bands of shingled tracks. The method 600 allows each band, which each may contain more data than can be stored in an associated buffer space, to be split into segments containing one or more tracks and the method 600 can perform a read-modify-write-write (RMWW) operation for each segment while implementing a logical guard band.

In some embodiments, a band may be split into multiple virtual segments for purposes of performing a RMWW operation on the whole band. In the method 600, a first segment may be read and may include an initial track, track X through track Y which may contain N tracks, at 602. The amount of allocated data in tracks X through Y, inclusive of X and Y, should not exceed the size of an associated buffer. Further, the amount of allocated data in tracks X through Y, inclusive of X and Y should not exceed the size of a first scratchpad (spA). Data operations may be performed on the data in the buffer, at 604, such as modifying the data from the selected tracks with any new data received from a host.

A check may be performed, at 606, to determine whether track Y is a physical guard track, which also could be considered the last track in a band, in which case no logical guard track may be needed. In some of the examples described herein, a last track of a band may be assumed to be a physical guard track, but one could define the last track of the band as a non-guard track and not include a physical guard track as part of a defined band, in such a case, slight variations to the examples given herein can be made to accomplish the same.

Continuing, when Y is not a physical guard track, the data in tracks X though Y can be stored into spA from the buffer, at 608. When Y is a physical guard track, data from tracks X through Y−1 can be stored into spA, at 610. This is because data on a physical guard track, if there is any, may be unreadable or unusable, thus a physical guard track may not contain address mapped storage locations. In future iterations of the process, selected data may be stored in spB.

Once the selected data has been stored to spA or spB, tracks X through Y−1 can be stored to the main storage device, at 612. In a shingled storage system, a write to Y−1 may corrupt the data at track Y, resulting in track Y becoming corrupt, thus keeping a copy of data of track Y in either spA or spB (or both if so desired) can create a logical guard track while segmenting a band. Failure to write data from track Y to spA or spB (or another location) prior to writing data to track Y−1 in the corresponding band could result in loss of data on track Y.

Once the current segment has been written to the main data storage device, the method 600 may determine if there are more segments of the selected band that have not yet undergone the segmented RMWW operation. If all the segments corresponding to the selected band have been written, and there are no more segments of the selected band to write, that is the whole band or applicable segments of the band have gone through the RMWW operation, the process may end, at 616. When another segment of tracks is required, X may be incremented by Zx, and Y may be incremented by Zy, at 618. In an embodiment, Zx can be equal to Y−X+1, and Zy can be greater than or equal to Zx. When Zx equals Y−X+1, a new starting track of the next segment should be one track higher than the logical guard track, which the data from the previous logical guard track, Y−1, may be in the buffer or may be previously stored into spA or spB.

For example, a segment containing six tracks may have started at track 100 and ended at track 105 with the logical guard track at track 105. This could result in Zx=6, thus moving the first track of the next segment, track X, from track 100 to track 106. When Zy=Zx, the last track in the segment, track Y, is also shifted by six tracks, moving from track 105 to track 111. It may be desirable to set Zx=Zy because the segment size would remain the same through each iteration of the process. In some embodiments, however, it may be advantageous to have segments increase in track size during some or all of the iterations of the process, in which case it may be necessary to set Zy to a value greater than or less than Zx. For example, consider a case where a segment containing six tracks may have started at track 100 and ended at track 105 is incremented as follows: X=X+Zx and Y=Y+Zy, where Zx=Y−X+1, and Zy=Y−X+2. Under such an incrementing scheme, the first track in the segment may be moved from track 100 to track 106 and the last track in the segment may be moved from track 105 to track 112, the resulting segment containing seven tracks rather than six. Thus, Zx and Zy may change value for each iteration based on the selections of the systems, which may correspond to maximize efficiency in the buffer or the scratchpad areas.

After X and Y have been incremented by Zx and Zy, respectively, it may be necessary to determine when track Y is a physical guard track in which case no logical guard track may be needed. The process may be repeated until a physical guard track is reached or the system has completed a RMWW operation for all of the selected band. Thus, scratchpads spA and spB can alternate throughout the process regardless of how many segments there are. There is no rule, however, that the number of scratchpads be limited to two, more scratchpads could be used if desired.

Figure 7:
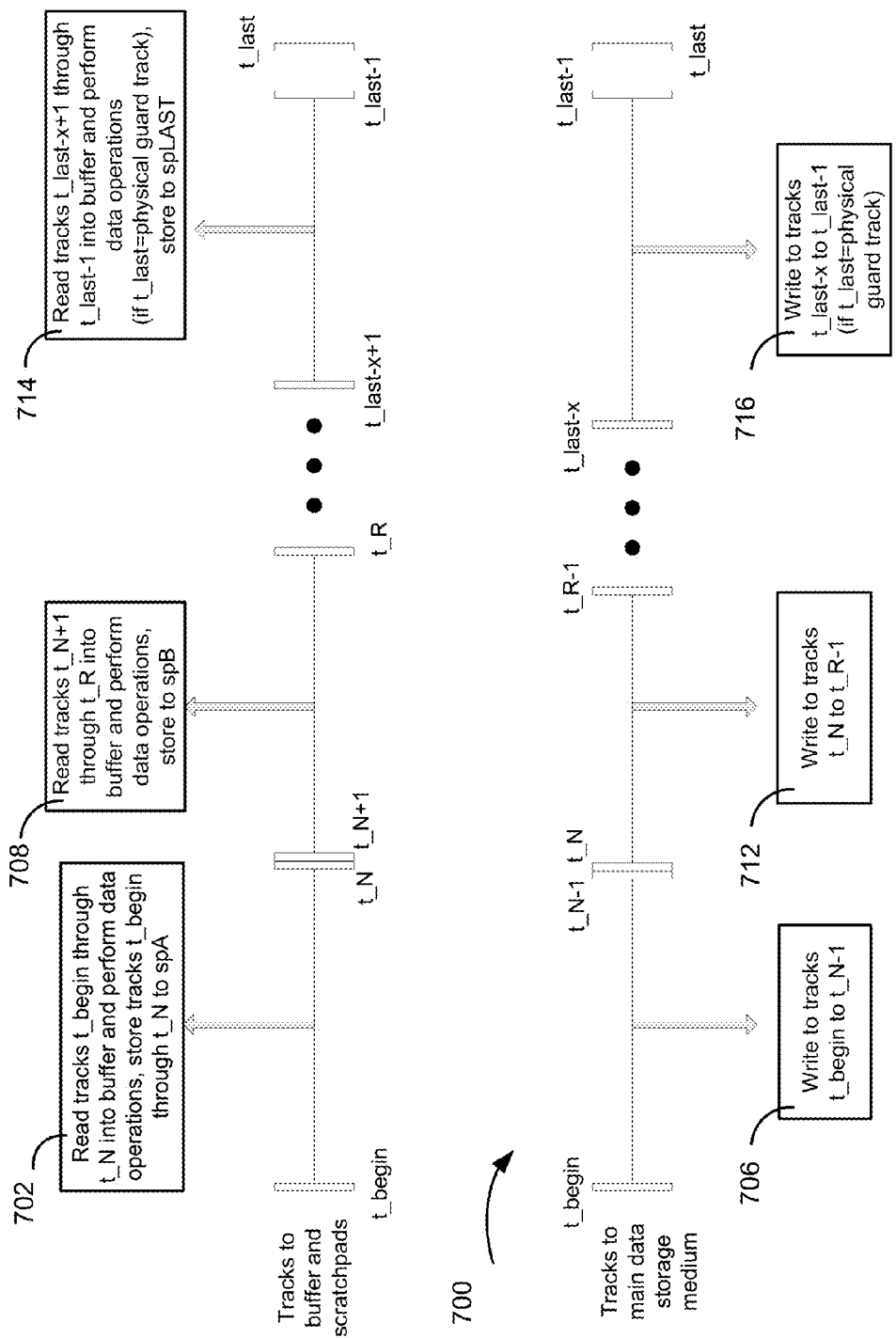
FIG. 7 is a diagram of another illustrative embodiment of shingled recording for use with segmented read-modify-write operations.

FIG. 7 is an illustrative embodiment of a method of segmenting of read-modify-write operations. The illustrative process can start at track t_begin and end at t_last. For purposes of this example, t_last is either a last track of a selected band or a physical guard track. When a band is to undergo a RMW operation, data may be read from tracks t_begin to t_N to a buffer where data operations can be performed, at 702. The modified data corresponding to tracks t_begin to t_N can be stored to a first scratchpad (spA), also at 702. This ensures that when track t_N−1 is overwritten, at 706, a copy of the data for track N is stored in a scratchpad even though it may be corrupted on the main storage; data in track N may now be considered a logical guard track. Next, tracks t_N+1 to t_R can be read from the main storage into the buffer, modified, and stored to spB, at 708. Then, the data may be written to the main storage, which could result in tracks t_begin through t_R−1 stored in the main data storage medium as part of the current RMW operation, thus track t_R would become a logical guard track.

The process can easily be expanded to accommodate bands of different sizes. In this embodiment, the process continues to the end of the band. At 714, data from tracks t_last−x+1 through t_last−1 are read into the buffer and modified. Since t_last−x should also be in the buffer still, tracks t_last−x through t_last−1 can be stored to scratchpad spLAST. Scratchpad spLAST may be spA, spB, or an entirely different scratchpad. Tracks t_last−x through t_last−1 can now be written to the corresponding tracks t_last−x through t_last−1 on the main data storage medium. When the process reaches the last segment of a band, there may be no need for a logical guard track because a physical guard track may be present. In the provided example, the last track t_last can be a physical guard band and need not be stored into any scratchpads.

Figure 8:
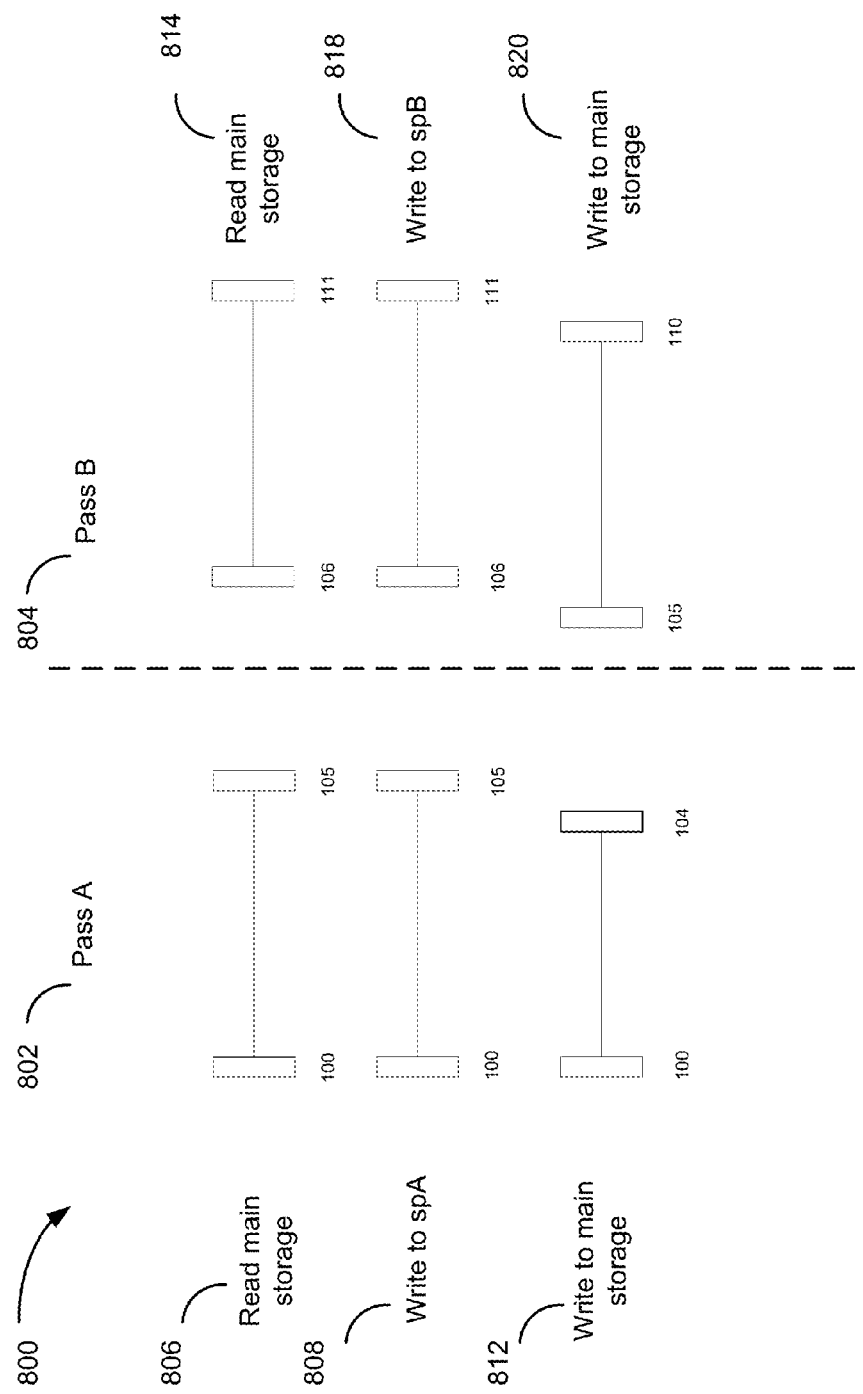
FIG. 8 is a diagram of another illustrative embodiment of shingled recording for use with segmented read-modify-write operations.

Referring to FIG. 8, a graphical representation of a method of segmenting of read-modify-write operations is shown, and generally designated 800. In the specific example shown, the system may write two segments of data, each segment comprised of up to six tracks; however, more segments or different segment sizes can be written as needed. In the example shown, the tracks in the first segment may include tracks 100 through 105 while the tracks in the second segment could include tracks 106 through 111.

The method 800 may include two iterations, or passes, with each pass showing the processes that can be performed during segmented read-modify-write operations. In the first pass (Pass A) 802, tracks 100 through 105 may be read from the main data storage device into a buffer, at 806. The method 800 may perform modify, merge, or other data operations while the data is in the buffer. Next, the data corresponding to tracks 100 through 105 can be stored to spA, at 808. Tracks 100 through 104 may then be written to the main data storage device, at 812. Track 105 may then be a logical guard track because a copy of the data corresponding thereto can be in the buffer and a copy can be stored in spA, while the corresponding track 105 on the main data storage device could be corrupted due to writing of track 104.

Moving to the second pass (Pass B) 804, the second segment may comprise track 106 through track 111 and can be read from the main data storage device, at 814. The data corresponding to tracks 106 (or 105 since it should also be in the buffer still) to 111 can be stored to spB, at 818. Tracks 105 through 110 may then be written to the corresponding tracks of the main data storage device, at 820.

Recall that valid data from track 105 from the main data storage device can still be in the buffer and may also still be in spA. Thus, when the data tracks 105 to 110 are written to the corresponding tracks on the main data storage device at 820, track 105 is to be overwritten with valid data and will cease to be a logical guard track, making track 111 now a logical guard track.

In some embodiments, there can be a plurality of passes, such as a third pass (Pass C)(not shown), a fourth pass (Pass D) (not shown), and so on. A scratchpad may be used more than once during the process. For example, spA could be used in Pass A, Pass C, and so on. The size of spA, however, need not be the same for each pass; it could depend on the segment size. If a segment in Pass C contains eight tracks, it is possible that the size of spA in Pass A might be different than in Pass C.

In accordance with various embodiments, the methods described herein may be implemented as one or more software programs running on a computing device, such as a computer processor or controller. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods and processes described herein may be implemented as a computer readable data storage medium or device including instructions that when executed cause a processor to perform the methods and processes.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. For instance, the segmenting of RMW operations discussed herein can be useful for data storage devices or storage mediums that use an RMW operation or comparable operation, such as a program-erase cycle for solid state memories. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a data storage medium including a band of tracks having multiple data tracks arranged in a shingled manner where at least one track partially overlaps an adjacent track;
   a controller configured to:
      virtually divide the band of tracks into at least a first segment and a second segment, each segment containing at least one track;
      perform a first read-modify-write-write operation for the first segment; and
      perform a second read-modify-write-write operation for the second segment.

2. The apparatus of claim 1, comprising:
   the controller further configured to:
      read the first segment into a buffer;
      modify data of the first segment in the buffer;
      write the modified data of the first segment to a first scratchpad; and write a portion of the modified data of the first segment that is less than all of the first segment to physically adjacent tracks corresponding to the first segment on the data storage medium.

3. The apparatus of claim 2, comprising:
the controller further configured to:
read the second segment into the buffer;
modify data of the second segment in the buffer;
write the modified data of the second segment including at least a last track of the first segment to a second scratchpad; and
write a portion of the modified data of the second segment that is less than all of the second segment to physically adjacent tracks corresponding to the second segment on the data storage medium.

4. The apparatus of claim 3, wherein the portion that is less than all of the first segment is the first segment minus a last adjacent track of the first segment.

5. The apparatus of claim 4, wherein the portion that is less than all of the second segment is the second segment minus a last adjacent track of the second segment.

6. The apparatus of claim 1, comprising:
the controller further configured to:
repeat performing a read-modify-write-write operation for any additional segments until all tracks within the band have gone through a corresponding read-modify-write-write operation; and
stop performing read-modify-write-write operations for the band when a last track in a segment is a physical guard band separating the band from other tracks not in the band.

7. The apparatus of claim 1, further comprising:
a first scratchpad;
a second scratchpad; and
the controller is further configured to write the first segment to the first scratchpad during the first read-modify-write-write operation and write the second segment to the second scratchpad during the second read-modify-write-write operation.

8. The apparatus of claim 7, comprising: the controller is further configured to alternate between writing to the first scratchpad and the second scratchpad for further read-modify-write-write operations for additional segments of the band.

9. The apparatus of claim 1, further comprising: the first segment includes a first range of physically adjacent tracks of the band; the second segment includes a second range of physically adjacent tracks of the band; and the first track of the second segment is adjacent to the last track of the first segment.

10. A method comprising:
dividing a shingled band of tracks of a data storage medium into at least a first segment and a second segment, each segment containing at least one track;
performing a first read-modify-write-write operation for the first segment; and
performing a second read-modify-write-write operation for the second segment.

11. The method of claim 10, further comprising the data storage medium includes multiple shingled bands of tracks having multiple overlapped data tracks arranged in a manner where at least one track partially overlaps an adjacent track.

12. The method of claim 10 further comprising implementing a logical guard band between the first read-modify-write-write operation and the second read-modify-write-write operation.

13. The method of claim 10 further comprising:
performing a read-modify-write-write (RMWW) operation for any additional segments until all tracks within the shingled band have gone through a corresponding read-modify-write-write operation; and
stop performing RMWW operations for the band when a last track in a segment is a physical guard band separating the shingled band from other tracks not in the band.

14. The method of claim 13 further comprising implementing a floating logical guard band between segments corresponding to two successive read-modify-write-write operations.

15. The method of claim 13 further comprising implementing a floating logical guard band and moving the floating logical guard band to between a segment last processed through a RMWW operation and a next segment to be processed through a RMWW operation.

16. The method of claim 10, further comprising:
writing the first segment to a first scratchpad during the first read-modify-write-write operation; and
writing the second segment to a second scratchpad during the second read-modify-write-write operation.

17. The method of claim 16, further comprising alternating writing to the first scratchpad and the second scratchpad for alternate iterations of additional read-modify-write-write operations corresponding to additional segments of the shingled band.

18. A controller adapted to:
divide a shingled band of tracks of a data storage medium into at least a first segment and a second segment, each segment containing at least one track;
perform a first read-modify-write-write operation for the first segment; and
perform a second read-modify-write-write operation for the second segment.

19. The controller of claim 18 further adapted to
implement a logical guard band between the first read-modify-write-write operation and the second read-modify-write-write operation, wherein the logical guard band is not a physical guard band after the second read-modify-write-write operation has completed.

20. The controller of claim 18 further adapted to
write the first segment to a first scratchpad during the first read-modify-write-write operation; and
write the second segment to a second scratchpad during the second read-modify-write-write operation.

* * * * *